C. TADEY.
PLANET DRIVING GEAR.
APPLICATION FILED JULY 17, 1914.

1,221,626.

Patented Apr. 3, 1917.

Witnesses—

Inventor
CARL TADEY
by
Attorney.

UNITED STATES PATENT OFFICE.

CARL TADEY, OF WETTER-RUHR, GERMANY, ASSIGNOR TO DEUTSCHE MASCHINEN-FABRIK AKTIENGESELLSCHAFT, OF DUISBURG, GERMANY.

PLANET DRIVING-GEAR.

1,221,626.  Specification of Letters Patent.  Patented Apr. 3, 1917.

Original application filed December 23, 1912, Serial No. 738,237. Divided and this application filed July 17, 1914. Serial No. 851,569.

*To all whom it may concern:*

Be it known that I, CARL TADEY, a subject of the German Emperor, residing at 5 Kirchstrasse, Wetter-Ruhr, Germany, have invented a certain new and useful Planet Driving-Gear, of which the following is a specification.

Planet driving gear is mostly employed for obtaining large changes in speed when comparatively small floor space is available. The constructions hitherto in general use employ the differential action for this purpose, in that by the planet drive the difference between the peripheral speeds of two gear wheels rotating at the same angular speed but varying from one another in the pitch-circle diameter is transferred to the shaft which is to be reduced in speed. Such driving gear, however, has a very small efficiency. This disadvantage is obviated according to the present invention by the high change being obtained not by differential action but merely by the ratio of the number of teeth of the gear wheels in engagement.

Figure 1:
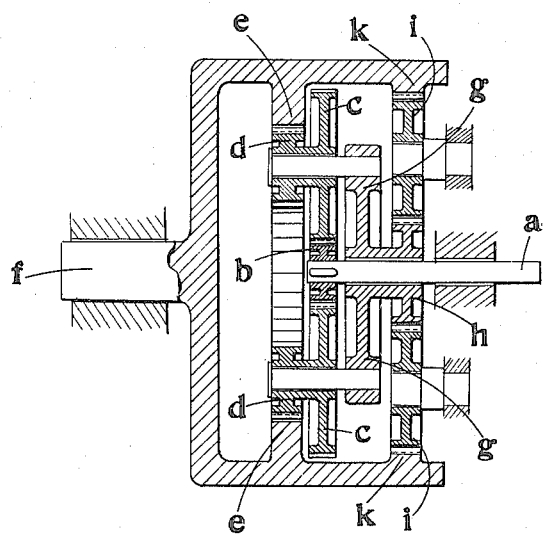
Figure 2:
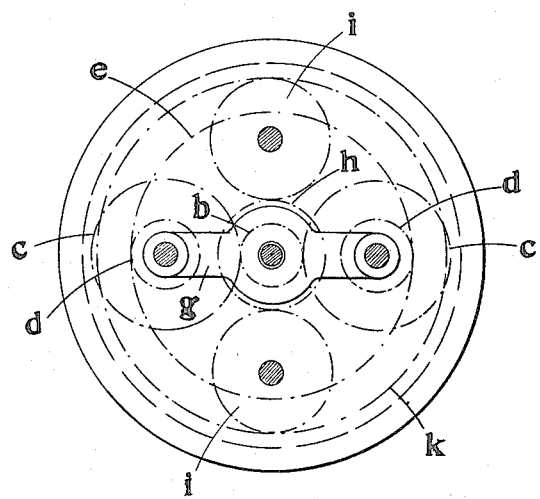

The invention is illustrated by way of example in the accompanying drawings, in which Figure 1 shows a longitudinal section through the driving gear and Fig. 2 the side elevation with the pitch lines shown dotted.

Referring to the drawings, $f$ designates the low speed shaft and $a$ the high speed shaft, the former being shown as rigidly connected to an inclosing shell for the mechanism, and which shell is provided with two internally toothed rims $e$ and $k$ respectively. Intermediate gearing, including planet wheels, is provided between these two rims and the fast running shaft $a$ in such a manner that a high velocity ratio is obtained between the two said shafts $f$ and $a$. This is effected by providing a planet gear connection between the rim $e$ and the shaft $a$, rotating said planet gear from the internally toothed rim $e$, and effecting a revolution of the planet gear about the shaft $a$. To this end a planet gear wheel, or preferably planet gear wheels, $d$ are arranged to engage the internally toothed rim $e$ and through a gear wheel, or preferably gear wheels, $c$ attached to the wheel $d$, to rotate or be rotated by a pinion $b$ which is fixedly secured to the shaft $a$. The gear wheels $d$ and $c$ are adapted to be revolved bodily about the shaft $a$ as an axis through the medium of a carrying frame $g$, rotatably mounted upon the shaft $a$, and upon which frame the said wheels $d$ and $c$ are rotatably mounted. Rotation of the frame $g$ is effected from the internally toothed rim $k$ through an intermediate gear wheel, or preferably gear wheels, $i$ which engage a gear wheel $h$ rotatably mounted on the shaft $a$ and fixedly secured to the carrying frame $g$. The operation is as follows—Assuming, for simplicity, that power is applied to the shaft $f$, which is given one revolution counter-clockwise, and that the wheels have the following number of teeth and velocity ratios:

$$\begin{matrix} b—8 \\ c—40 \end{matrix} \text{Ratio, } 1:5$$
$$\begin{matrix} d—16 \\ e—64 \end{matrix} \text{Ratio, } 1:4$$
$$\begin{matrix} i—30 \\ h—12 \end{matrix} \text{Ratio, } 5:2$$
$$\begin{matrix} k—72 \\ i—30 \end{matrix} \text{Ratio, } 12:5$$

One counter-clockwise rotation of rim $k$ will then effect $\left(\frac{k}{h}+1\right)$ or 7 revolutions of $h$ and $g$. At the same time $d$ has made $\left(\frac{k}{h}+1\right)\times\frac{e}{d}$ or 28 revolutions counter-clockwise. $b$ makes $\left(\frac{k}{h}+1\right)\times\left(-\frac{e}{d}\times\frac{c}{b}\right)-\frac{k}{h}$ or 146 revolutions, in the clockwise direction.

In general $$\frac{a}{f}=\left(1+\frac{k}{h}\right)\times\left(-\frac{e}{d}\times\frac{c}{b}\right)-\frac{k}{h}$$

The present invention is a division of a prior application filed by me the 23rd day of December, 1912, Serial #738237.

What I claim as my invention and desire to secure by Letters Patent is:—

1. Planet driving gear, comprising: a low speed shaft, and a high speed shaft; two internally toothed rims connected with the low speed shaft; a planet gear connection between one of said rims and the high speed shaft; and means driven from the other of said rims to revolve said planet gear connection about the high speed shaft.

2. Planet driving gear, comprising: a low speed shaft, and a high speed shaft; two internally toothed rims connected with said low speed shaft; a planet gear engaging one of said rims; a gear wheel rotatable with said high speed shaft, and a gear wheel engaging the same and rotatable with said planet gear wheel; and means to revolve said planet gear wheel about said high speed shaft, and consisting of a gear wheel mounted to rotate about a fixed axis, and engaging the other of said rims, a gear wheel rotatably mounted upon said high speed shaft and engaging the said rim-engaging gear wheel, and a frame driven by said gear wheel rotatable upon the high speed shaft and upon which frame are rotatably mounted said planet gear wheel and the gear wheel driven thereby.

In testimony whereof I have hereunto signed my name to this specification in the presence of two subscribing witnesses.

CARL TADEY. [L. S.]

Witnesses:
ALBERT NUFER,
FRANCES NUFER.